United States Patent [19]

Gehlhaar

[11] Patent Number: 5,805,843
[45] Date of Patent: Sep. 8, 1998

[54] MICROPROCESSOR BUS INTERFACE UNIT FOR INTERFACING AN N-BIT MICROPROCESSOR BUS TO AN M-BIT MEMORY DEVICE

[75] Inventor: Jeffrey B. Gehlhaar, San Diego, Calif.

[73] Assignee: Qualcomm Incorporated, San Diego, Calif.

[21] Appl. No.: 595,318

[22] Filed: Feb. 1, 1996

[51] Int. Cl.$^6$ ..................................................... G06F 13/28
[52] U.S. Cl. ........................... 395/309; 395/309; 395/842
[58] Field of Search ................... 395/309, 410, 395/478, 503, 292, 500, 520, 450, 800, 386, 387, 425, 250, 325, 842; 364/200, 518

[56] References Cited

U.S. PATENT DOCUMENTS

| | | | |
|---|---|---|---|
| 4,315,308 | 2/1982 | Jackson | 364/200 |
| 4,860,198 | 8/1989 | Takenaka | 364/200 |
| 5,247,643 | 9/1993 | Shottan | 395/425 |
| 5,255,374 | 10/1993 | Aldereguia et al | 395/325 |
| 5,303,353 | 4/1994 | Matsuura et al. | 395/325 |
| 5,359,717 | 10/1994 | Bowles et al. | 395/325 |
| 5,594,878 | 1/1997 | Shibata et al. | 395/309 |
| 5,623,697 | 4/1997 | Bland et al. | 395/842 |

*Primary Examiner*—Jack B. Harvey
*Assistant Examiner*—Eric S. Thlang
*Attorney, Agent, or Firm*—Russell B. Miller; Roger W. Martin

[57] ABSTRACT

A bus interface unit disposed for incorporation within a microprocessor system having a local microprocessor bus, a memory unit, and a system bus coupled to the memory unit is disclosed herein. The bus interface unit includes a bus control unit having an address latch for latching N-bit memory addresses impressed upon the local microprocessor bus by the microprocessor. Each of the N-bit memory addresses identifies one or more M-bit memory locations within the memory unit. The bus interface unit further includes a multiplexing interface for transferring data associated with the M-bit memory locations between the system bus and the local microprocessor bus during microprocessor memory access cycles. A programmable wait state generator serves to control the duration of the microprocessor memory access cycles in order to accommodate address and data transfer between the system bus and the local microprocessor bus during both memory read and write access cycles. In a preferred implementation the N-bit memory addresses latched during microprocessor bus cycles correspond to a sequential pair of M-bit memory locations.

12 Claims, 11 Drawing Sheets

MICROPROCESSOR BUS INTERFACE UNIT FOR INTERFACING AN N-BIT MICROPROCESSOR BUS TO AN M-BIT MEMORY DEVICE

BACKGROUND OF THE INVENTION

I. Field of the Invention

The present invention relates to electronic microprocessors, and in particular to an improved method and apparatus for transferring data between such microprocessors and external memory designed for communication over data buses of different size.

II. Description of the Related Art

In certain types of microprocessors, a set of sixteen pins are used to provide addresses and data during read and write accesses of an external device such as a random access memory (RAM) unit. For each access, the same sixteen pins are used to transfer address and data information between the two devices over a 16-bit data bus. During a first phase each access, the microprocessor generates an address upon the sixteen pins to access either (i) a single one of the two bytes stored as a 16-bit word, or (ii) the entire 16-bit word. When this address is made available by the microprocessor, it is latched following issuance by the microprocessor of an address latch enable (ALE) signal. During a second phase of a write access, the microprocessor provides data over either the upper/lower set of eight pins, or over the entire set of sixteen pins for a "word" write operation. The first and second phases of "read" operations proceed similarly. During a "word" read operation the microprocessor receives a 16-bit word over the data bus during the second phase of the read access, and for single-byte operations receives only 8-bits over either the upper/lower set of eight pins.

In a memory arrangement of this type, the sixteen pins of the microprocessor are directly connected via the upper and lower portions of the 16-bit data bus to the sixteen data ports of the RAM unit. The RAM unit is itself internally organized into a sequence of 16-bit memory locations, each of which may be accessed through the sixteen data ports. In particular, the upper, lower or both data bytes at each location are capable of being transferred through these data ports to the upper, lower, or both portions of the 16-bit data bus, respectively. However, there also exist "8-bit" RAM units which are internally structured to exchange address/data information over an 8-bit data bus. Such 8-bit RAM units are often less expensive than 16-bit RAM units, and may offer lower read/write access times. Unfortunately, 8-bit RAM units are incompatible with microprocessors (e.g., '186-type microprocessors) configured for operation with a 16-bit data bus. This incompatibility arises because an 8-bit RAM unit is incapable of receiving or responding to "word" (i.e., 16-bit) read/write accesses over its associated 8-bit data bus. Incompatibility exists even in the case of single-byte read/write requests issued by the microprocessor, since the 8-bit RAM unit includes no provision for being switchably connected to either the upper or lower set of eight pins over which the microprocessor is expecting to receive the requested single byte of data.

Accordingly, a need in the art exists for a device capable of providing an interface between a microprocessor designed for connection to a 16-bit data bus and a memory unit configured for operation with an 8-bit data bus.

SUMMARY OF THE INVENTION

In summary, the present invention is a bus interface unit disposed for incorporation within a microprocessor system having a local microprocessor bus, a memory unit, and a system bus coupled to the memory unit. The bus interface unit includes a bus control unit having an address latch for latching an N-bit memory address impressed upon the local microprocessor bus by the microprocessor. Each N-bit memory address corresponds to one or more M-bit memory addresses identifying M-bit memory locations within the memory unit.

The bus interface unit further includes a mulitplexing interface for transferring data associated with the M-bit memory locations between the system bus and the local microprocessor bus during microprocessor memory access cycles. A programmable wait state generator serves to control the duration of the microprocessor memory access cycles in order to accommodate address and data transfer between the system bus and the local microprocessor bus during both memory read and write access cycles. In a preferred implementation, selected parts of the latched N-bit memory addresses are transformed so as to correspond to a sequential pair of M-bit memory locations.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
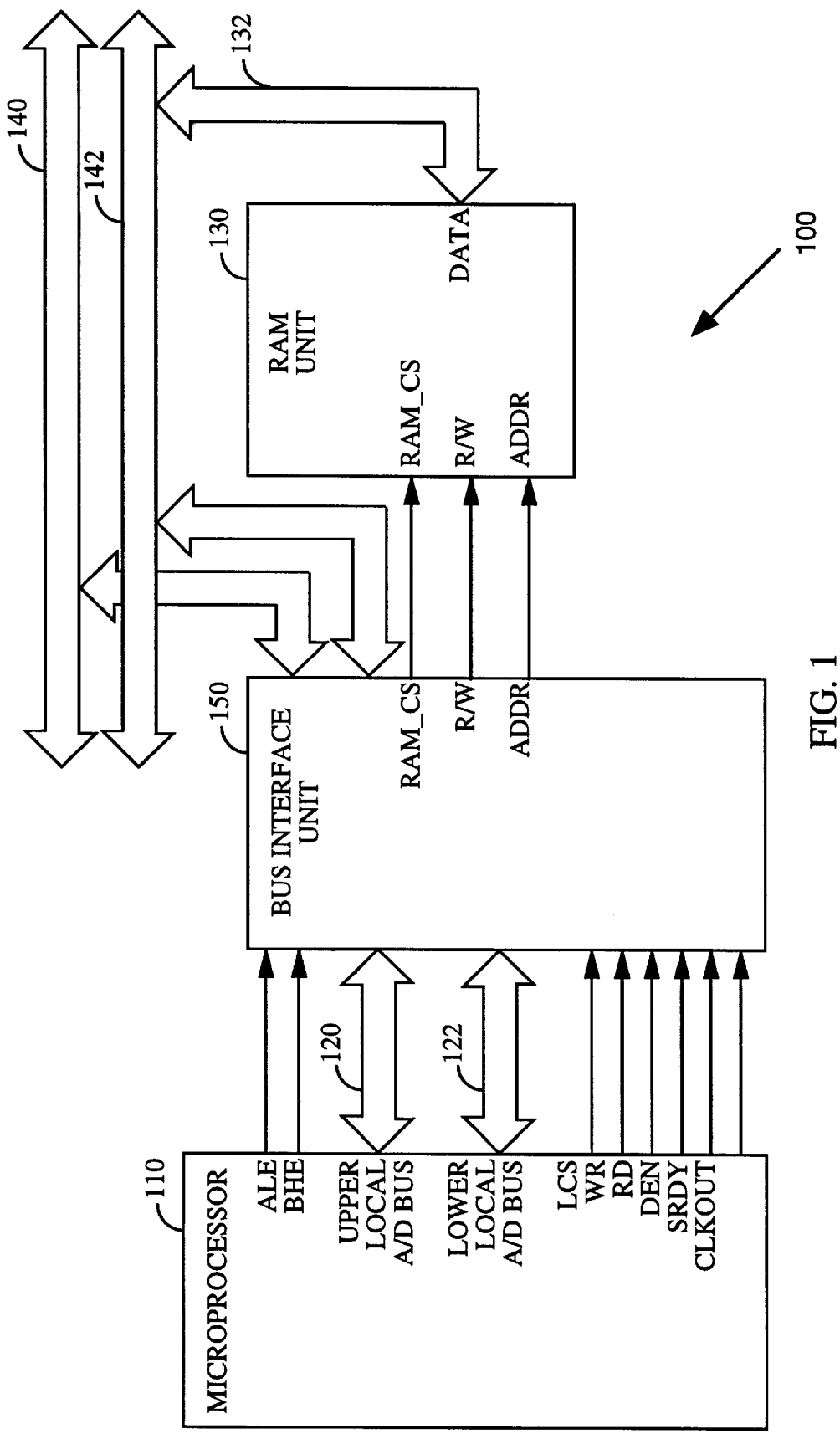
FIG. 1 shows a bus interface unit of the present invention incorporated within an exemplary microelectronic processor system.

Referring to FIG. 1, a bus interface unit 150 of the present invention is shown incorporated within an exemplary microelectronic processor system 100. The exemplary processor system 100 includes a 16-bit microprocessor 110, as well as a 16-bit local address/data (A/D) bus comprised of an upper local A/D bus 120 and a lower local A/D bus 122. The 16-bit microprocessor 110 may issue read/write requests corresponding to "word" operations in which sixteen bits of data are transferred over the upper and lower local A/D buses 120 and 122, as well as single byte read/write requests in which only the upper local A/D bus 120 or lower local A/D bus 122 is used to transfer the eight bits of data. Although in the exemplary embodiment the microprocessor 110 comprises a '186-type microprocessor or compatible device, it is recognized that the present invention will also be of utility in other N-bit microprocessor systems.

The processor system 100 further includes an M-bit (e.g., 8-bit) random access memory (RAM) unit 130, an 8-bit memory bus 132 coupled to a DATA port thereof, and a 16-bit system data bus comprised of an 8-bit upper system data bus 140 and an 8-bit lower system data bus 142. The system data bus is used during the transfer data between the microprocessor 110 and the memory unit 130, as well as between the microprocessor 110 and other peripheral devices such as, for example, system read-only memory (not shown). The RAM unit 130 further includes a read/write (R/W) control input 144 which receives from the microprocessor 110 a control signal indicative of whether a read or write access is being requested. In addition, a RAM chip select (RAM_CS) signal of predefined polarity is provided to the RAM unit 130 when it is being accessed by the microprocessor 110.

In conventional microprocessor memory systems, the upper system data bus 140 and lower system data bus 142 are typically not buffered from the microprocessor's local address/data buses. That is, the upper system data bus 140 and lower system data bus 142 are usually directly coupled to the upper local A/D bus and to the lower local A/D bus 122, respectively. However, this direct coupling does not permit transfer of 16-bit words from the upper local A/D bus 120 and lower local A/D bus 122 to devices such as the RAM unit 130 coupled only to, for example, the lower system data bus 142. In the case of single-byte data transfer to or from only one of the local buses, '186-type microprocessors expect data transfer to occur over the upper local A/D bus 120 when an odd addresses is specified, and expect the eight bits of data to be transferred over the lower local A/D bus 122 when an even address is specified. It follows that data transfer is normally not possible between the odd addresses of the RAM unit 130 and the microprocessor 110, since the RAM unit 130 places data (via memory bus 132) upon the lower system bus 142. That is, when an odd address is specified the microprocessor 110 expects valid data upon the upper local bus 120 rather than upon the lower local bus 122 which, again, is conventionally directly connected to the lower system bus 142.

In accordance with the invention, a bus interface unit (BIU) 150 is interposed between the upper/lower local buses 120 and 122 and the upper/lower system buses 140 and 142 as a means of facilitating greater flexibility in data transfer between the microprocessor 110 and associated peripheral devices. Specifically, the BIU 150 allows 16-bit word read/write operations to take place between the microprocessor 110 and 8-bit peripheral devices such as the RAM unit 130. In addition, the BIU 150 allows the microprocessor 110 to access both and even and odd address locations of 8-bit peripheral devices irrespective of whether such devices are coupled to the upper system bus 140 or to the lower system bus 142.

The BIU 150 converts each request for a word access, issued by the microprocessor 110 to the address (ADDR) input of the RAM unit 130, into a pair of separate single-byte access requests. In the case of a 16-bit word read operation, a first or "even" one of the bytes read from the RAM unit 130 is transferred by the BIU 150 from the lower system data bus 142 to the upper local A/D bus 120, and a second or "odd" one of the bytes is transferred from the lower system data bus 142 to the lower local A/D bus 122. In this way the data read from the RAM unit 130 is presented to the microprocessor 110 in the expected manner; that is, even and odd bytes are respectively impressed upon the upper local bus A/D bus 120 and upon the lower local A/D bus 122 as a unitary 16-bit word. Similarly, the BIU 150 converts 16-bit write accesses of the RAM unit 130 into a pair of single-byte write operations. As is discussed below, this is achieved by alternately multiplexing the data present upon the upper and lower local A/D buses 120 and 122 to the lower system bus 142.

Figure 2:
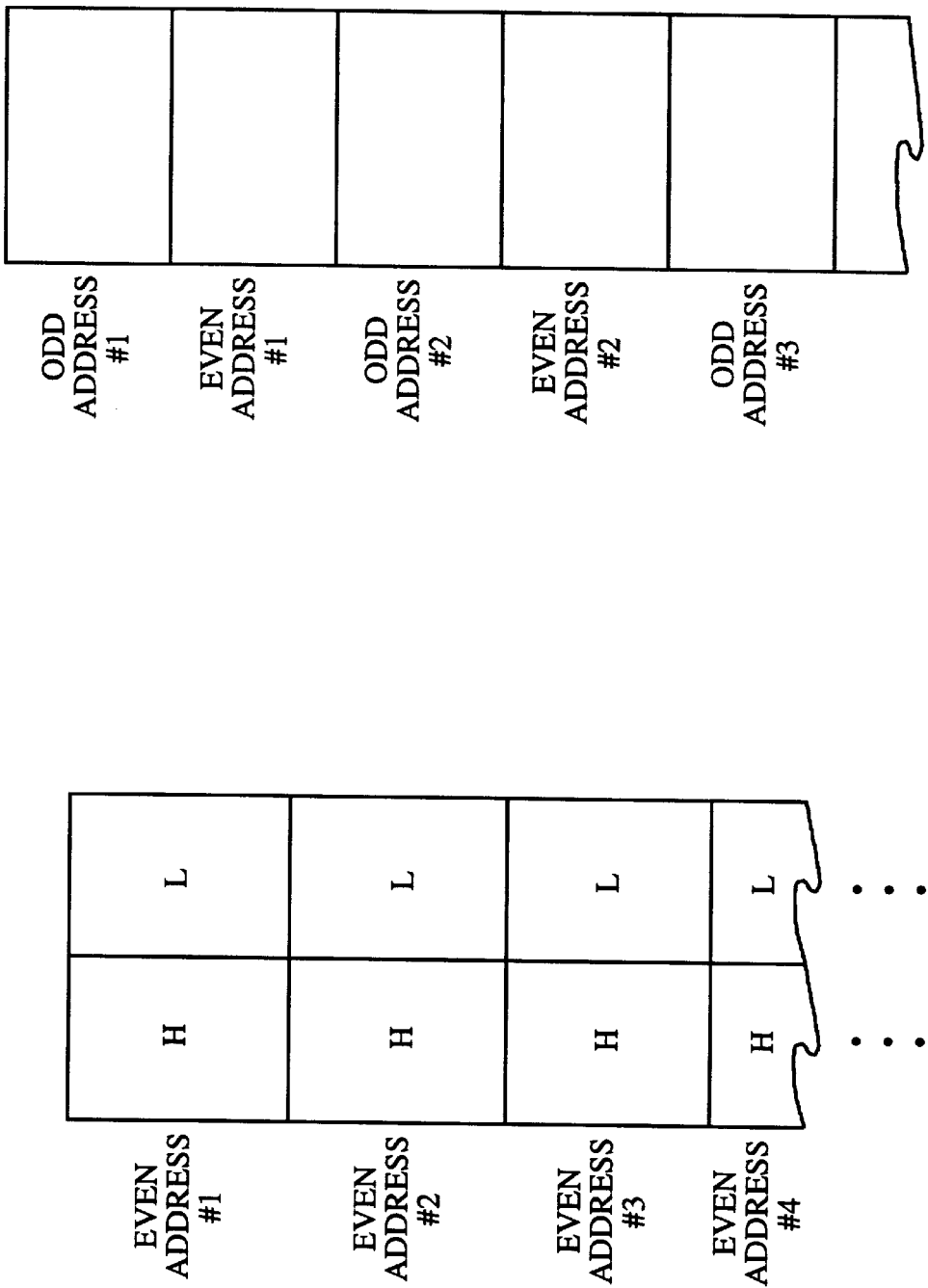
FIG. 2A depicts the organization of a conventional 16-bit memory unit in which are stored 16-bit words comprised of high (H) and low (L) bytes disposed to be accessed in a conventional manner.
FIG. 2B provides a representation of the internal structure of a random access memory (RAM) unit disposed to be accessed in accordance with the present invention.

Again, in the exemplary embodiment the microprocessor 110 comprises a '186-type microprocessor designed to interface with a 16-bit memory unit. Specifically, the microprocessor 110 is configured to request access to one or both of the bytes at each location within such a 16-bit memory unit. Each location within the 16-bit memory is identified by an even address, with the first (or "low") of the two bytes stored at the memory location being associated with the even address itself and the second (or "high") of the two bytes being associated with the next highest odd address. During memory accesses high bytes are directly coupled to the upper local A/D bus 120, and low bytes are directly coupled to the lower local A/D bus 122. In order to specify the low byte during a read or write access operation, the microprocessor 110 (i) uses the upper and lower local A/D buses 120 and 122 to present an even address, and (ii) does not assert its BHE line. The microprocessor 100 specifies the high byte by presenting an odd address while asserting the BHE line. Both the high and low bytes are specified (i.e., a "word" operation), by presenting an even address while asserting the BHE line. FIG. 2A depicts the organization of a conventional 16-bit memory unit in which are stored 16-bit words comprised of high (H) and low (L) bytes capable of being accessed in this manner.

Turning now to FIG. 2B, a representation is provided of the internal structure of the RAM unit 130. The RAM unit 130 is seen to be organized such that the high (H) and low (L) bytes of each 16-bit word appear at successive even and odd memory locations. However, since the RAM unit 130 is coupled via the memory bus 132 to only the lower system bus 142, the BIU 150 must be capable of multiplexing the lower system bus 142 to the upper local bus 120 during accesses involving high bytes, and of multiplexing the lower system bus 142 to the lower local bus 122 during accesses involving low bytes. For 16-bit word read operations, the low byte from an address at an even memory location M within RAM unit 130 is latched by the BIU 150 after being placed upon the lower system bus 142 by the memory bus 132. The latched low byte is then stored in a buffer within the BIU 150. The BIU 150 then changes the address provided to the RAM unit 130 to the next odd address M+1, and the high byte at address M+1 is then obtained by the BIU from the lower system bus 142. Both the buffered low byte and the high byte are then simultaneously placed by the BIU 150 upon the lower and upper local A/D buses 122 and 120, respectively.

For 16-bit word write accesses, the BIU initiates the operation by multiplexing the low byte impressed upon the lower local A/D bus 122 to the lower local system bus 142. The low byte is then coupled to a given even address location N within the RAM unit 130 via the memory bus 132. During this access of even address location N, the BIU 150 increments the address provided to the RAM unit 130, which results in the next odd address location (N+1) within the RAM unit 130 being selected. The BIU 150 then completes the 16-bit word write operation by multiplexing the high byte from the microprocessor 110 to the lower system bus 142, thereby providing the high byte to the odd address N+1.

Figure 3:
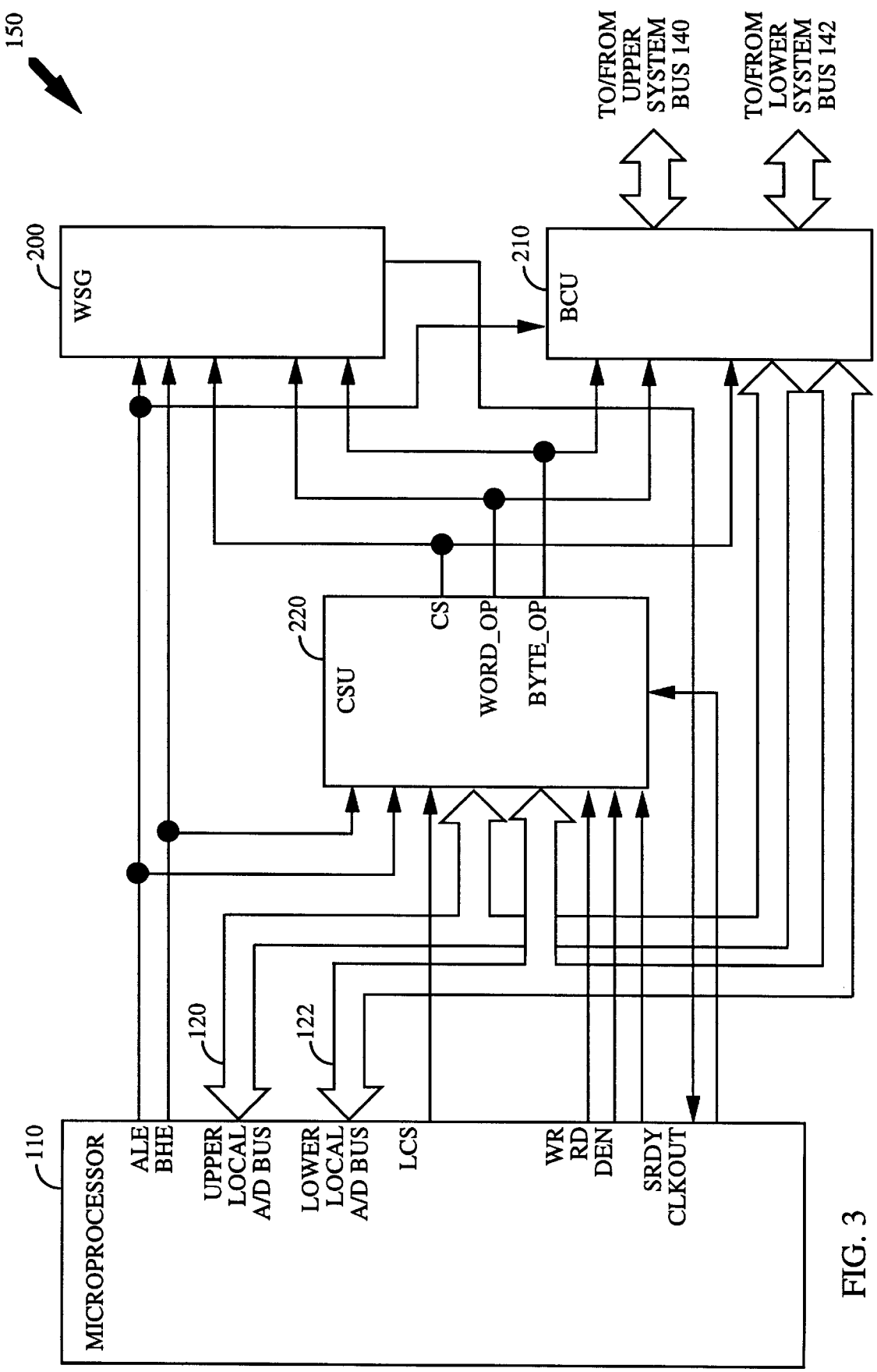
FIG. 3 is a block diagram of a bus interface unit of the present invention.

Referring now to the more detailed representation of the BIU 150 in FIG. 3, the BIU 150 is seen to include a wait state generator (WSG) 200, a bus control unit (BCU) 210, and a chip select unit (CSU) 220. The CSU 220 is disposed to generate the RAM chip select ($RAM_{13}$ CS) signal based upon the address information registered by the upper local bus 120 and lower local bus 122, as well as upon timing information provided by the microprocessor 110.

Within the CSU 220 is stored a programmable range of RAM address ranges. When a memory address within the range programmed for the RAM memory unit 130 is registered by the upper local bus 120, the RAM_CS causes the RAM memory unit to be selected. In this way the CSU 220 functions in conjunction with the WSG 200 and BCU 210 to configure available memory to be utilized as RAM, ROM or as an EEPROM. The CSU 220 is also capable of configuring the length of the memory cycles generated by the WSG 200 for PCS, EEPROM, LCS, RAM Word, RAM Byte and ROM accesses.

The CSU 220 also generates WORD_OP and BYTE_OP signals, respectively indicating that the current bus cycle is either a word or byte operation. This is accomplished by examining the least significant bit of the address generated during the current bus cycle together with a BHE/ signal (not shown), the latter of which is provided by the microprocessor 110. These signals are used by the CSU 220 to determine the requisite behavior of various multiplexers and counters within the BIU 150.

The WSG 200 serves to facilitate generation of bus cycles of longer duration than are capable of being produced by the internal waitstate generator of existing 80186-type microprocessors or the equivalent. This enables RAM word operations to be of sufficient duration to instead be used for two consecutive RAM byte accesses. The extended bus cycle duration effected by the WSG 200 also permits the microprocessor 110, in conjunction with the CSU 220, to access peripheral devices for extended periods.

More specifically, the WSG 200 serves to provide an SRDY signal to the microprocessor 110. When implemented as a '186-type microprocessor, the microprocessor 110 is programmed to expect the logical value of the SRDY signal to become high prior to completion of each read/write access cycle. Since the present invention contemplates converting 16-bit word read/write accesses into a pair of single-byte accesses, it is necessary for the WSG 200 to lengthen the cycle time for each 16-bit access in order to allow adequate time for completion of both single-byte accesses.

Figure 4A:
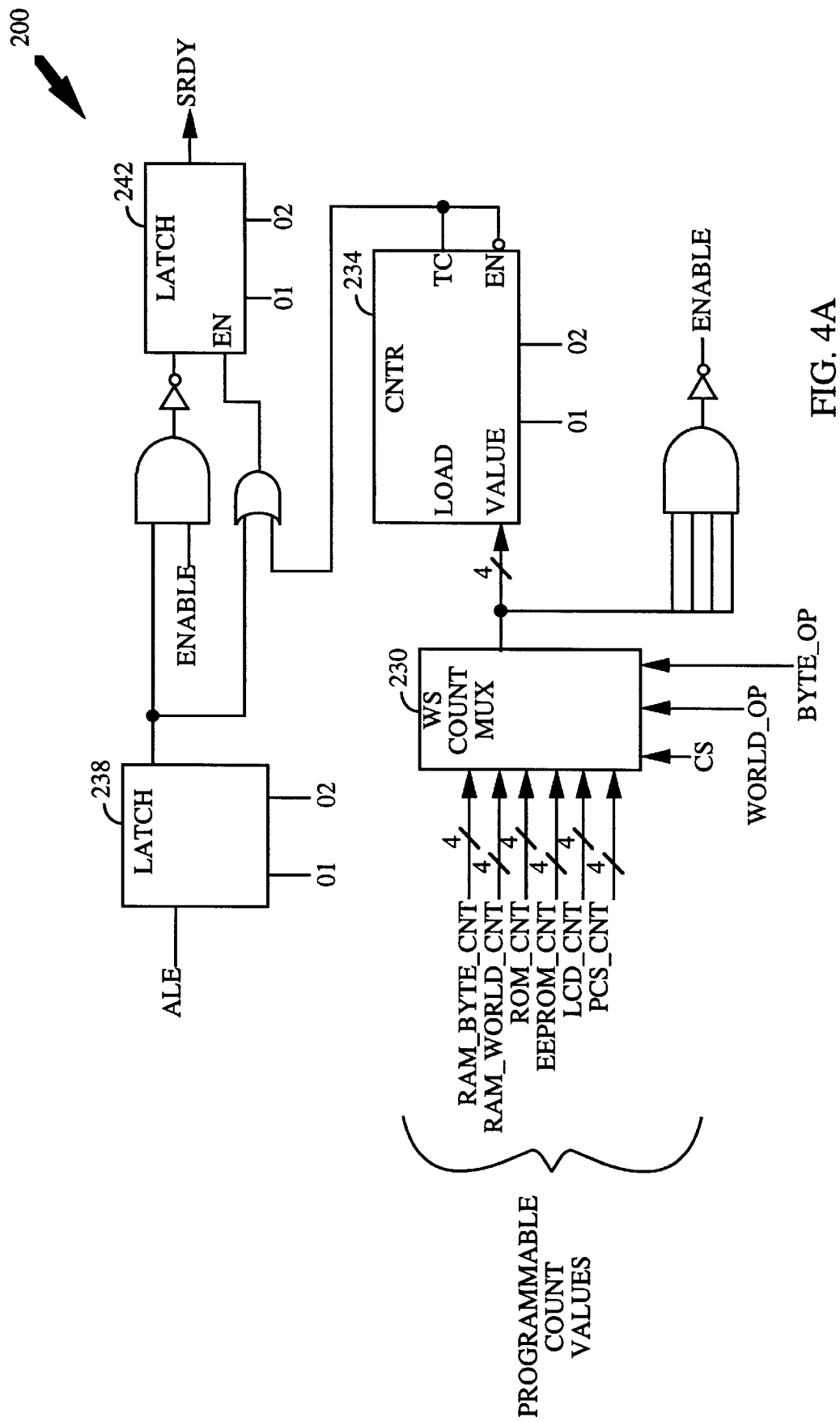
FIG. 4A is a block diagram representative of the internal structure of a bus control unit disposed within the bus interface unit of the present invention.

FIG. 4A is a block diagram representative of the internal structure of the WSG 200. During each bus cycle, the chip select signals produced by the CSU, along with the WORD_OP and BYTE_OP signals are used to select one of the programmable counter values corresponding to the active chip select during this cycle. The counter value is loaded into a counter. The transition of the ALE signal begins the counting processes, and the counter counts down from the loaded value to zero. This count results in the SRDY signal being low (inactive), so that the microprocessor's bus cycle is extended.

Figure 4B:
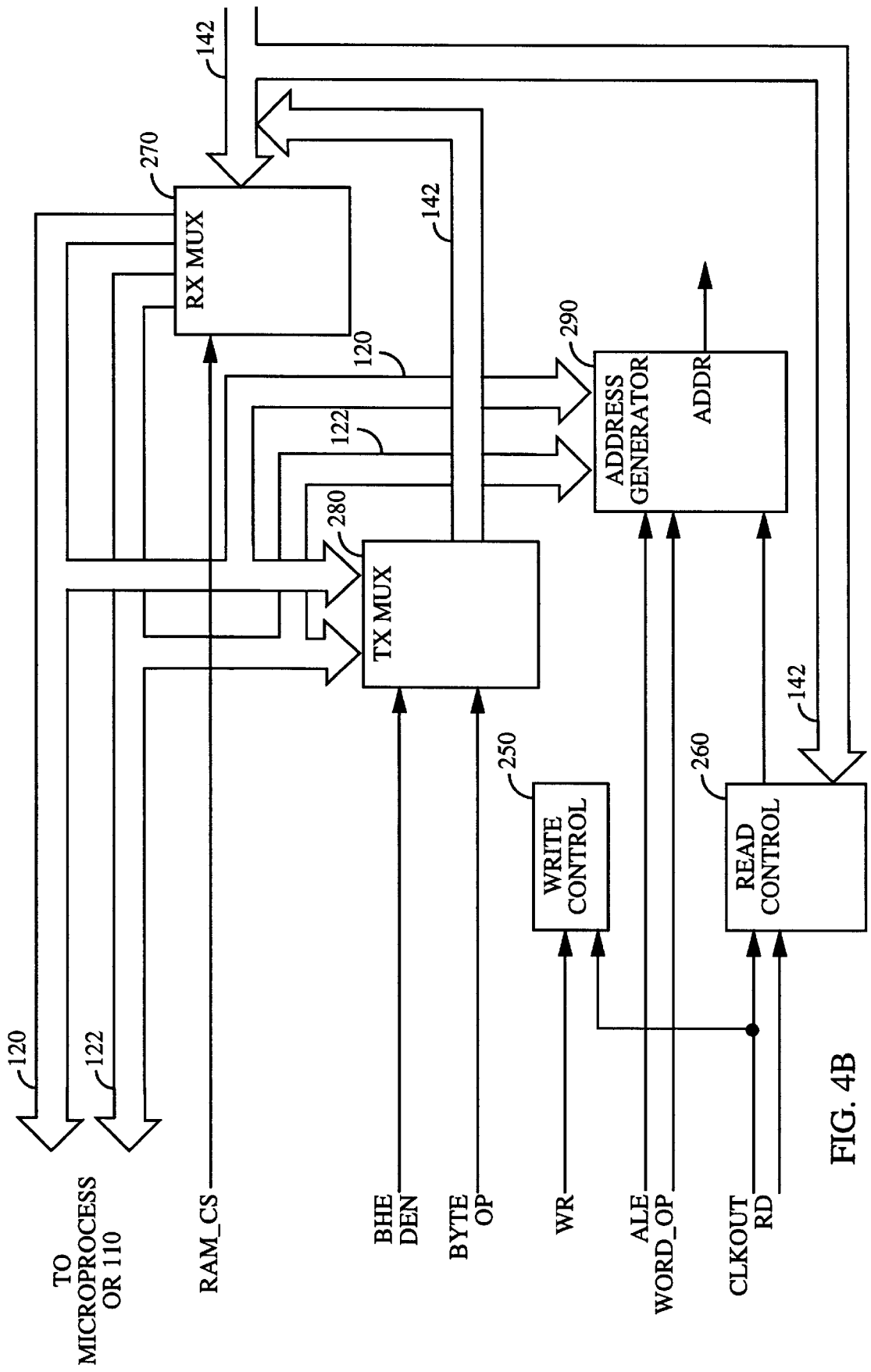
FIG. 4B is a block diagram representative of the internal structure of the chip select unit 220.

FIG. 4B is a block diagram representative of the internal structure of the bus control unit 210. The bus control unit 210 is seen to include a write control unit 250 and a read control unit 260, which are respectively disposed to work in conjunction with a receive multiplexer (RX mux) 270 and a transmit multiplexer (TX mux) 280. The RX mux 270 is operative during read accesses to multiplex data from the lower system data bus 142 to one or both of the upper and lower local A/D buses 120 and 122. During write accesses, the TX mux 280 functions to multiplex the data present upon one or both of the upper and lower local A/D buses 120 and 122 to the lower system data bus 142. The bus control unit 210 further includes an address generator 290 coupled to the upper and lower local A/D buses 120 and 122. The operation of the bus control unit 210 will now be described with reference to the timing diagrams of FIGS. 5–10, which are representative of the manner in which read and write accesses may be performed in accordance with the invention.

Figure 5:
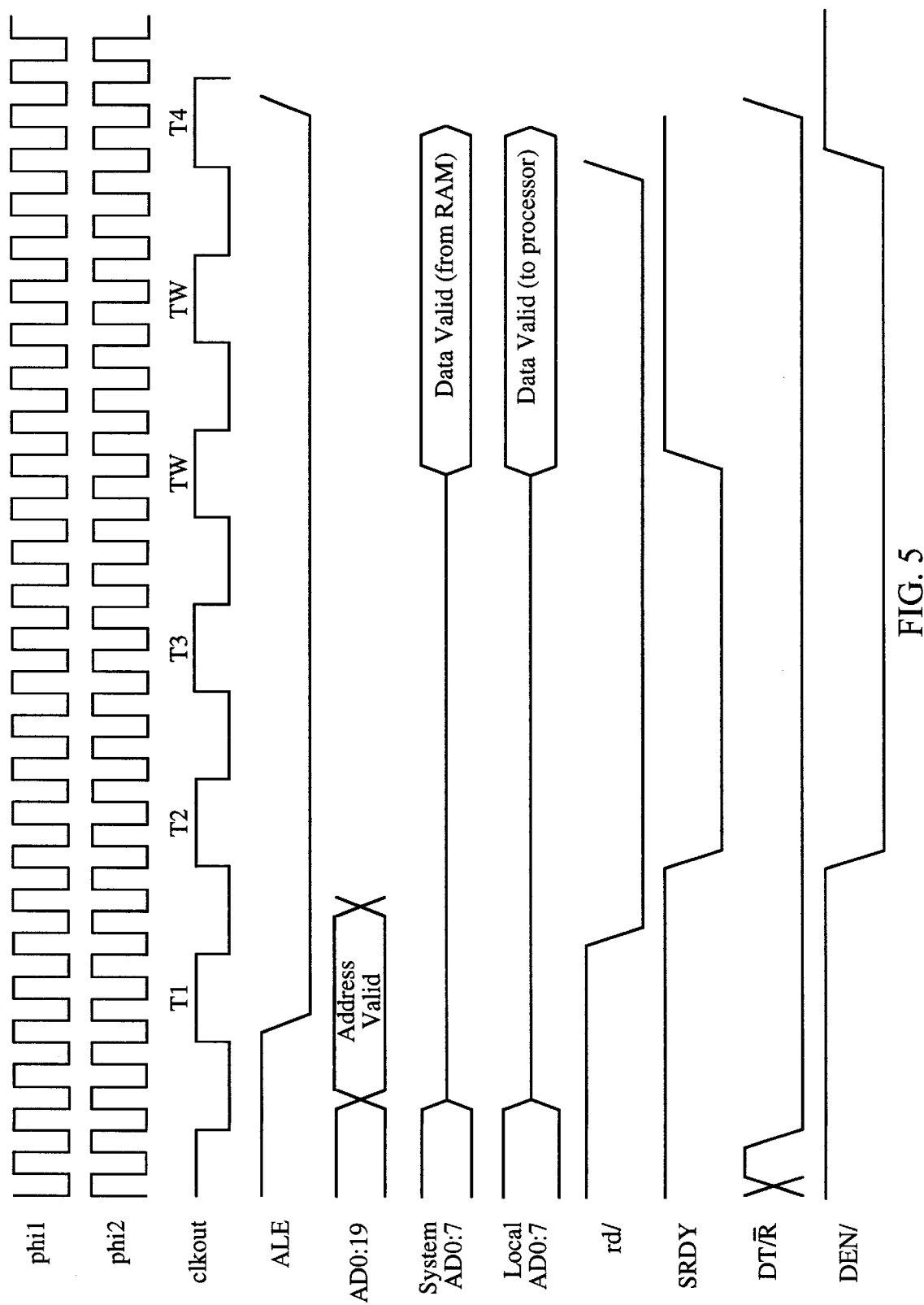
FIG. 5 is a timing diagram illustrating the signal wave forms arising during the reading of a single byte of data from an even memory address in accordance with the invention.

FIG. 5 is a timing diagram illustrating the signal wave forms arising during the reading of a single byte of data from an even memory address within the RAM unit 130. When a valid even address is jointly registered by the upper and lower local A/D buses 120 and 122, the microprocessor 110 lowers the ALE signal to a logical low. The address generator 290 (FIG. 4B) then latches the valid address, and provides the valid address to the RAM unit 130 over the ADDR input. In response, the RAM unit 130 places the data stored at the valid address upon the lower system data bus 142 via the memory bus 132. After expiration of a predefined read access period following the setting of the RD signal to a logical low, the read control unit 260 enables the RX mux 270 to multiplex the lower system data bus 142 onto the lower local A/D bus 122.

After the ALE and RD signals are set to a logical low, the WSG 200 (FIG. 3) holds the SRDY signal at a logic low for a predefined read cycle waiting period. After expiration of the predefined read access period, the WSG 200 raises the SRDY signal and thereby informs the microprocessor 110 that data may be latched from the lower local A/D bus 122.

Figure 6:
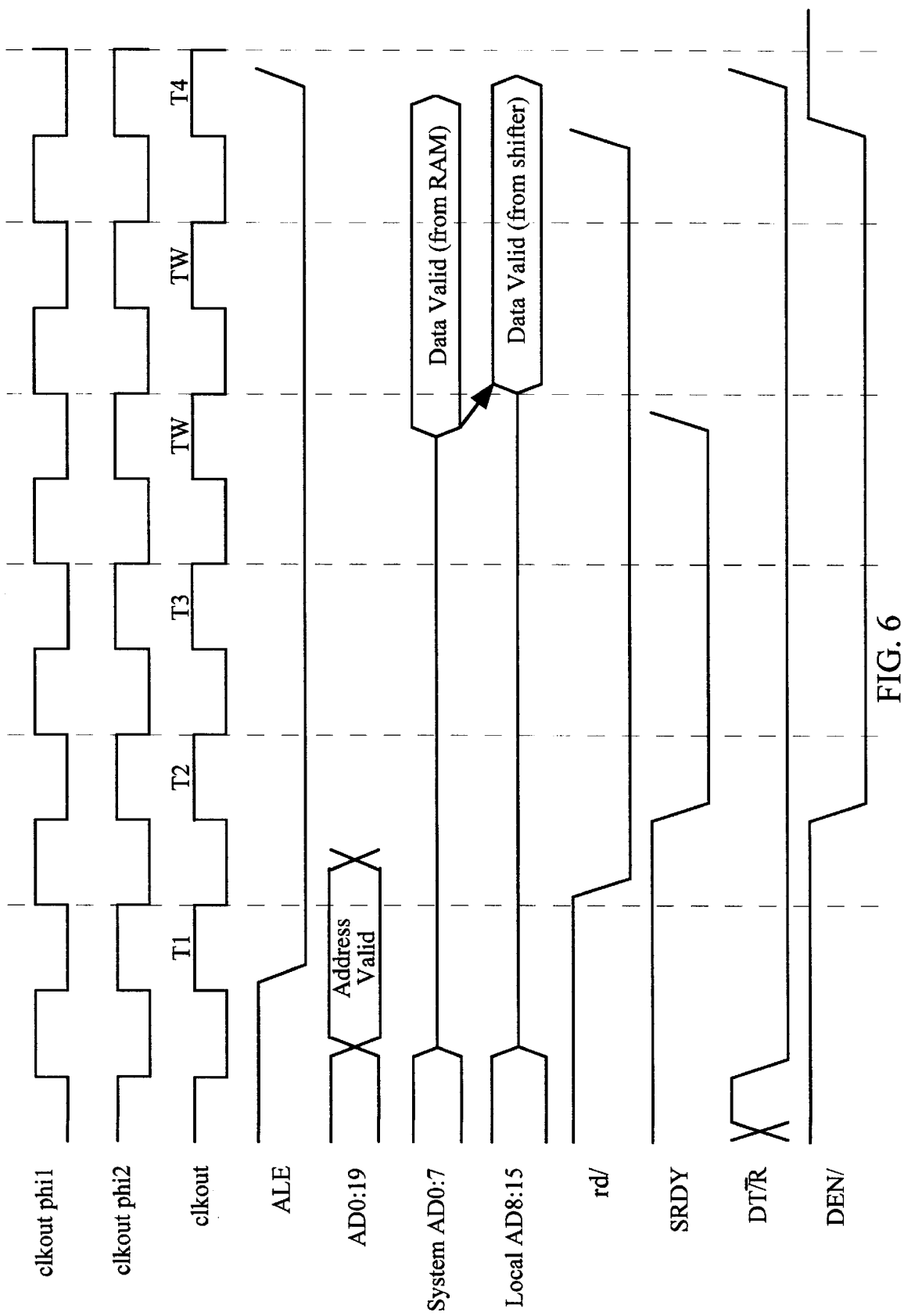
FIG. 6 is a timing diagram illustrating the various signal wave forms arising during the reading of a single byte of data from an odd memory address in accordance with the invention.

FIG. 6 is a timing diagram illustrating the various signal wave forms arising during the reading of a single byte of data from an odd address within the RAM unit 130. In this case valid data on the lower system bus 142 from the RAM unit 130 is multiplexed by the BIU 150 onto the upper local bus 120. The relationship between the various clock signals (i.e., SRDY, DT/R_bar and DEN/) is also depicted.

Figure 7:
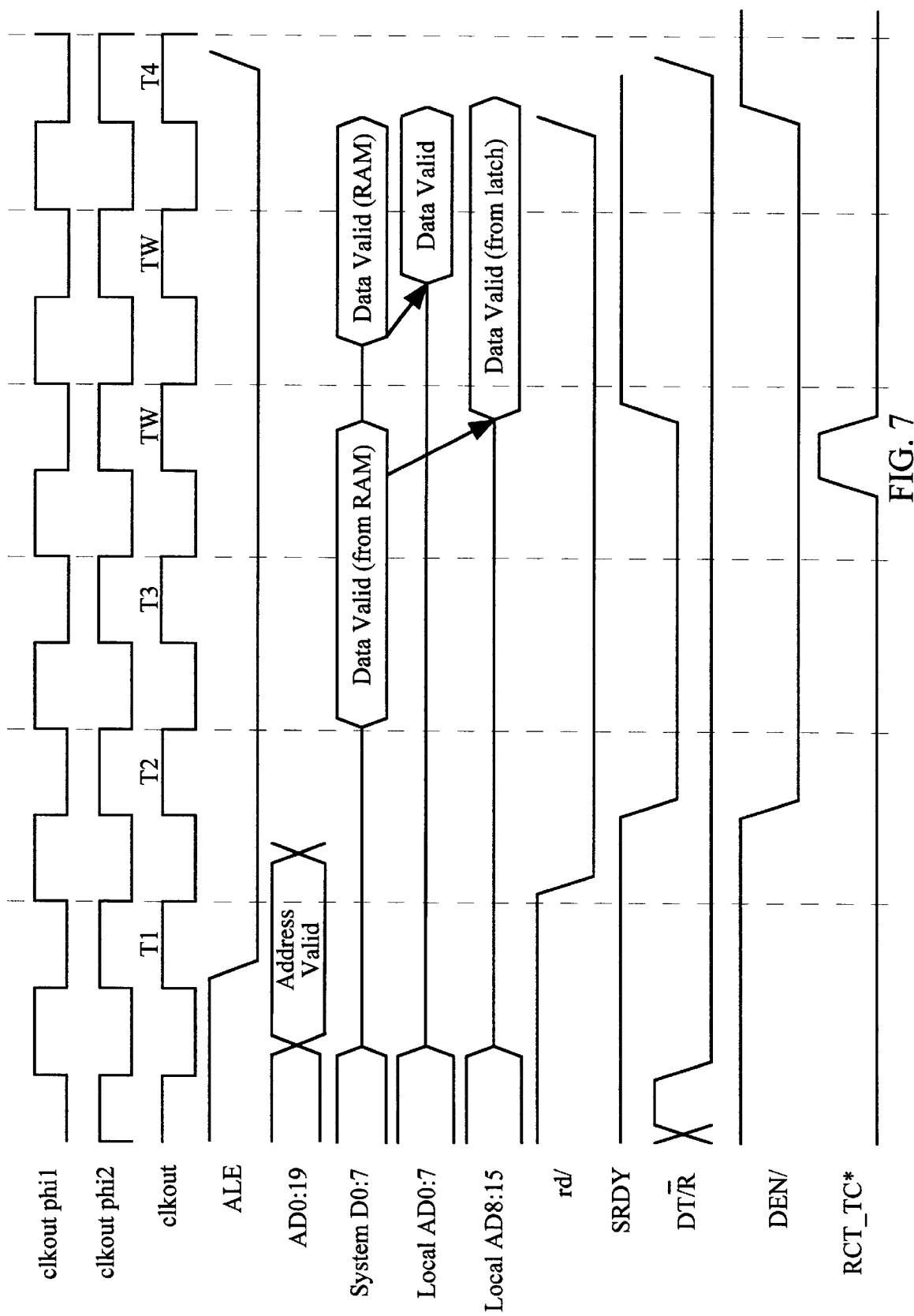
FIG. 7 is a timing diagram illustrating the various signal wave forms arising during the reading of a stored 16-bit data word in accordance with the invention.

FIG. 7 is a timing diagram illustrating the various signal wave forms arising during the reading of a 16-bit data word stored within the RAM unit 130. Initially, the first even byte is placed by the RAM 130 upon the lower system bus 142, and is captured by the BIU 150 during the first portion of the read operation. Upon being captured, this first even byte is then multiplexed to the lower local bus 122. During a second part of the read operation, the odd byte is multiplexed by the BIU 150 to the upper local bus 120 from the lower system bus 142. Accordingly, upon completion of the read operation both bytes are presented to the microprocessor 110 in the manner expected. Again, various clock and other signals have been shown to provide appropriate context. Also shown is read cycle time counter (RCT_TC) signal, which causes the BIU 150 to internally latch valid data from the lower system bus 142.

Figure 8:
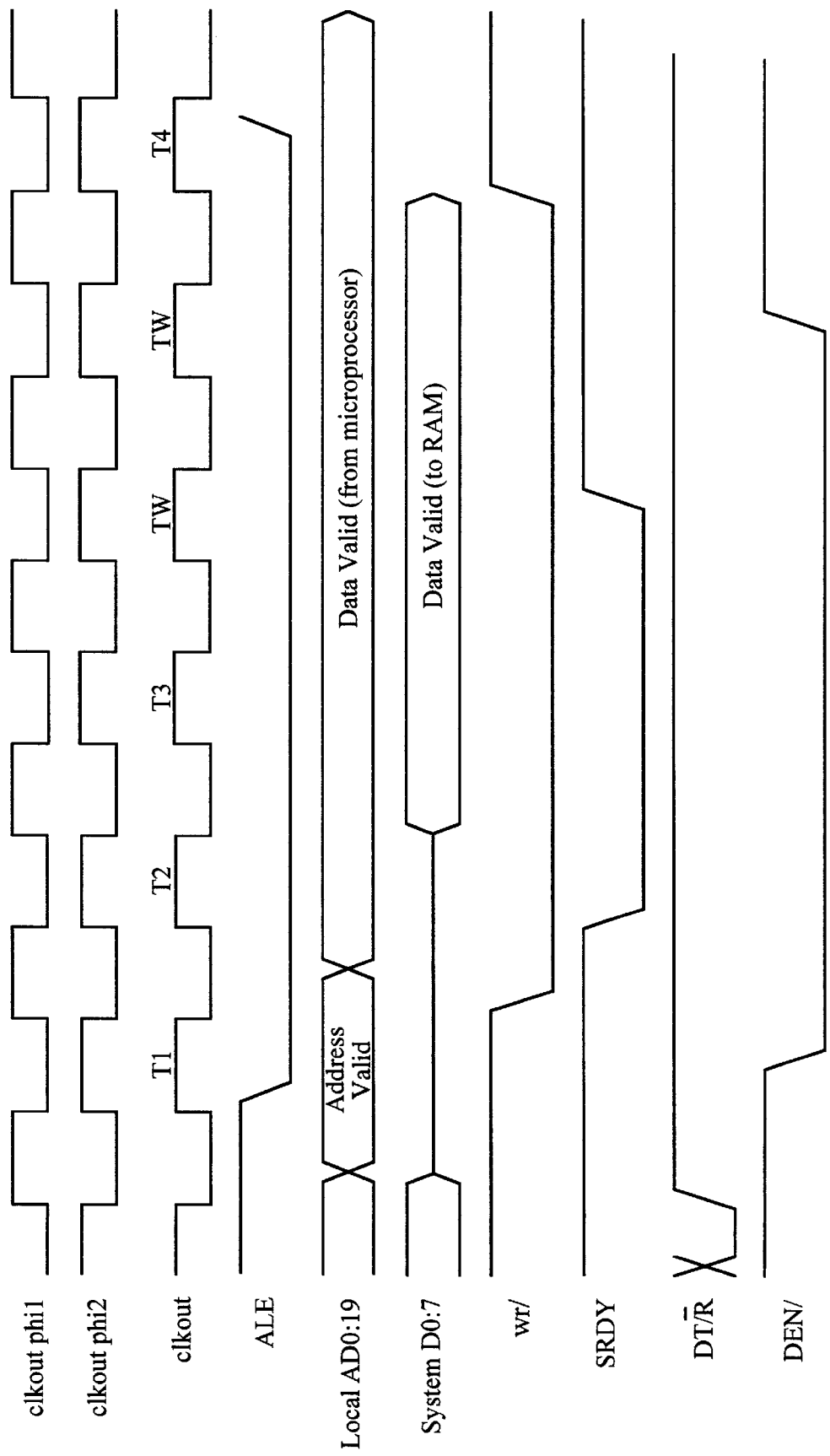
FIG. 8 is a timing diagram illustrating the various signal wave forms arising during the writing of a single data byte to an even memory address in accordance with the invention.

FIG. 8 is a timing diagram illustrating the various signal wave forms arising during the writing of a single data byte to an even address within the RAM unit 130. In this operation, data from the lower local bus 122 is transferred by the BIU 150 to the lower system bus 142.

Figure 9:
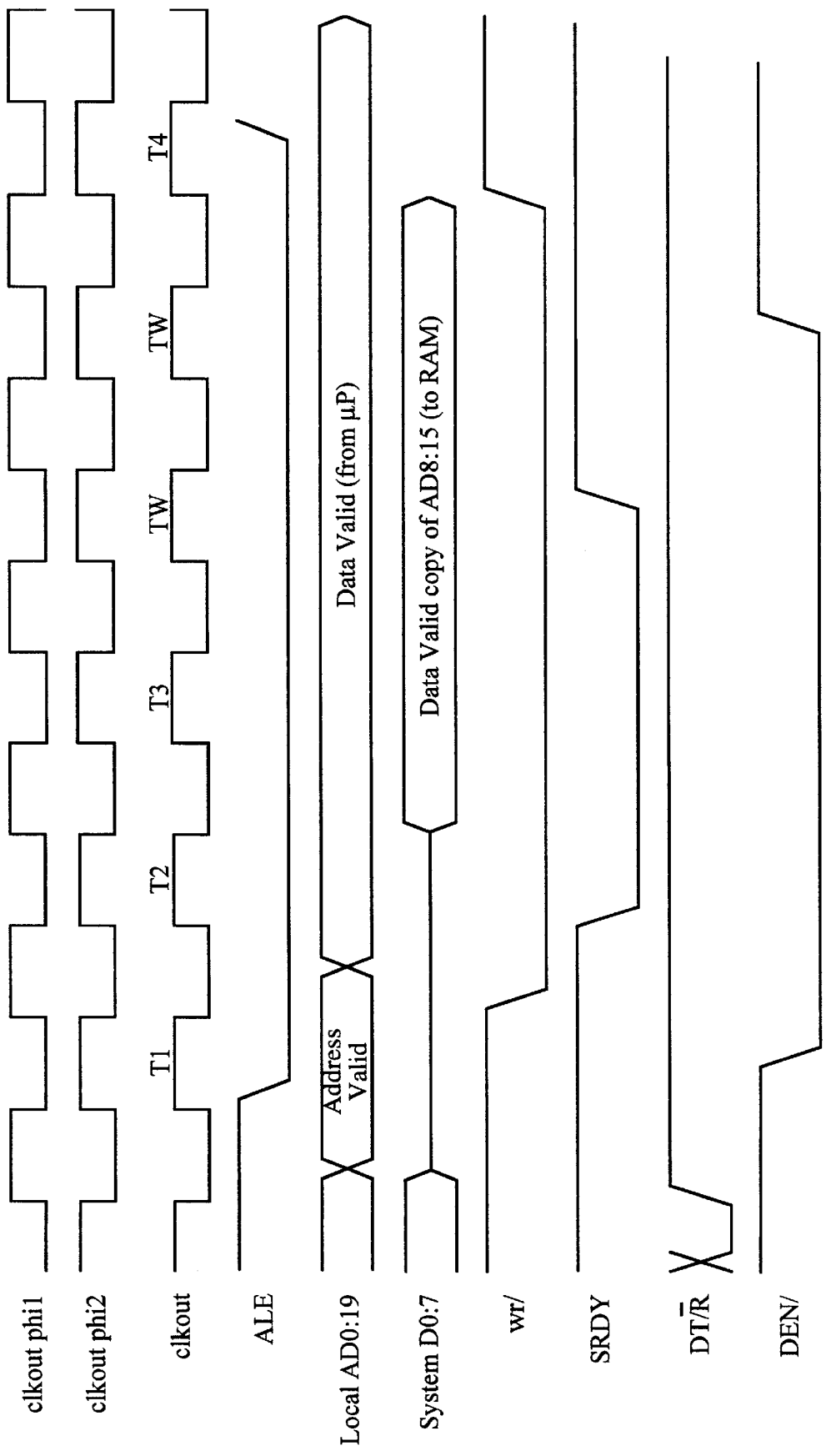
FIG. 9 is a timing diagram illustrating the various signal wave forms arising during the writing of a single data byte to an odd memory address in accordance with the invention.

FIG. 9 is a timing diagram illustrating the various signal wave forms arising during the writing of a single data byte to an odd address within the RAM unit 130. Data is initially presented by the microprocessor 110 to the BIU 150 on the upper local bus 120. In response, the BIU multiplexes the data to the lower system bus 142, to which the RAM 130 is actually coupled.

Figure 10:
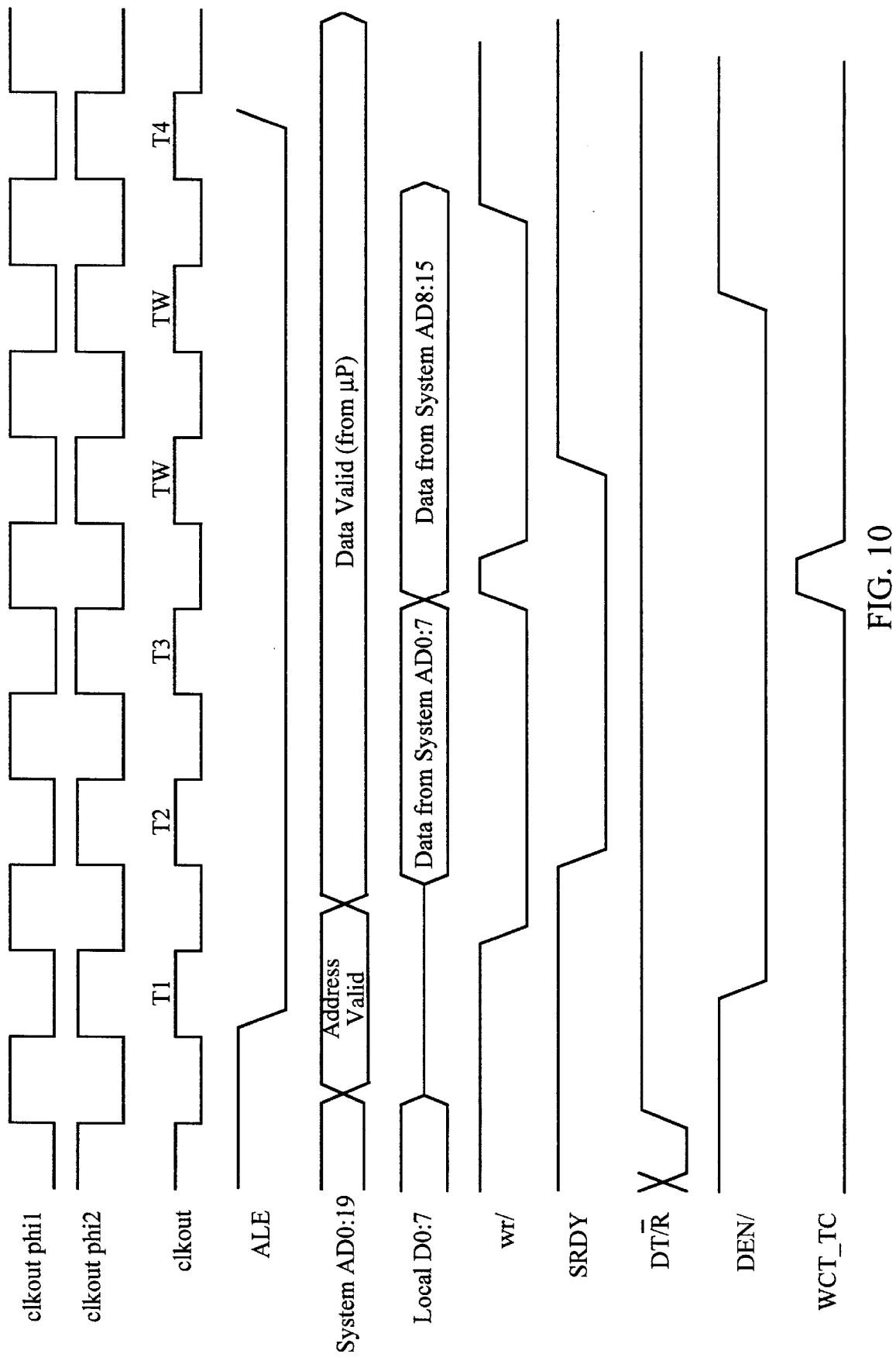
FIG. 10 is a timing diagram illustrating the various signal wave forms arising during the writing of a 16-bit word to memory in accordance with the invention.

FIG. 10 is a timing diagram illustrating the various signal wave forms arising during the writing of a 16-bit word to the RAM unit 130. The writing operation is initiated by conveying the first even byte from the lower local bus 122 to the lower system bus 142. The write signal is then brought to the inactive state, and the odd byte from the upper local bus 120 is multiplexed to the lower system bus 142. In this way a 16-bit value from the microprocessor 110 is written in two sections to an 8-bit RAM 130. The write cycle time counter (WCT_TC) signal is internal to the BIU 150, and causes the WR/ signal to transition to the inactive state between the two byte-writing operations. In this way the WCT_TC facilitates the copying of data from the upper and lower local buses 120 and 122 to the lower system bus 142.

The previous description of the preferred embodiments is provided to enable any person skilled in the art to make or use the present invention. The various modifications to these embodiments will be readily apparent to those skilled in the art, and the generic principles defined herein may be applied to other embodiments without the use of inventive faculty. Thus, the present invention is not intended to be limited to the embodiments shown herein but is to be accorded the widest scope consistent with the principles and novel features disclosed herein.

What is claimed is:

1. In a system including a microprocessor including a local microprocessor bus, a memory unit, and a system bus coupled to said memory unit, a microprocessor bus interface unit comprising:
   a bus control unit including:
      an address latch for latching selected parts of N-bit memory addresses impressed upon said local microprocessor bus by said microprocessor, said selected parts of said N-bit memory addresses comprising M-bit memory addresses identifying M-bit memory locations within said memory unit;
      a bus interface for transferring data associated with said M-bit memory locations between said system bus and said local microprocessor bus during microprocessor memory access cycles of said microprocessor;
      a programmable wait state generator for controlling duration of said microprocessor memory access cycles; and
      means for transferring data from said system bus to said local microprocessor bus during ones of said microprocessor memory access cycles corresponding to microprocessor read cycles, wherein said selected parts of said N-bit memory addresses latched during N-bit ones of said microprocessor read cycles correspond to a sequential pair of said M-bit memory locations.

2. The bus interface unit of claim 1 wherein said bus interface includes means for transferring data from said local microprocessor bus to said system bus during ones of said microprocessor memory access cycles corresponding to microprocessor write cycles.

3. The bus interface unit of claim 2 wherein said selected parts of said N-bit memory addresses latched during N-bit ones of said microprocessor write cycles correspond to a sequential pair of said M-bit memory locations.

4. The bus interface unit of claim 1 wherein said bus control unit further includes:
   a read cycle counter for dividing at least one of said microprocessor access cycles corresponding to a microprocessor read cycle into even and odd byte read cycles,
   a read latch for latching a first data byte from a first M-bit memory location of said memory unit during said odd byte read cycle, and
   multiplexer means for multiplexing, during said even byte read cycle, said first data byte onto an odd portion of said local microprocessor bus and a second data byte from a second M-bit memory location of said memory unit onto an even portion of said local microprocessor bus.

5. The bus interface unit of claim 1 wherein said bus control unit further includes:
   a write cycle counter for dividing at least one of said microprocessor access cycles corresponding to a microprocessor write cycle into even and odd byte write cycles, and
   multiplexer means for:
      multiplexing, during said odd byte write cycle, data present upon an odd portion of said microprocessor bus onto said system bus, and for
      multiplexing, during said even byte write cycle, data present upon an even portion of said local microprocessor bus onto said system bus.

6. In a system including a microprocessor including a local microprocessor bus, a memory unit, and a system bus coupled to said memory unit, a method for transferring data between said microprocessor and said memory unit comprising the steps of:
   latching selected parts of N-bit memory addresses impressed upon said local microprocessor bus by said microprocessor, said selected parts of said N-bit memory addresses comprising M-bit memory addresses identifying M-bit memory locations within said memory unit;
   transferring data associated with said M-bit memory locations between said system bus and said local microprocessor bus during microprocessor memory access cycles of said microprocessor;
   controlling duration of said microprocessor memory access cycles; and
   transferring data from said system bus to said local microprocessor bus during ones of said microprocessor memory access cycles corresponding to microprocessor read cycles, wherein said selected parts of said N-bit memory address latched during N-bit one of said microprocessor read cycles correspond to a sequential pair of said M-bit memory locations.

7. The method of claim 6 wherein said step of transferring data includes the step of transferring data from said local microprocessor bus to said system bus during ones of said microprocessor memory access cycles corresponding to microprocessor write cycles.

8. The method of claim 6 further including the steps of:
   dividing at least one of said microprocessor access cycles corresponding to a microprocessor read cycle into even and odd byte read cycles, latching a first data byte from a first M-bit memory location of said memory unit during said odd byte read cycle, and multiplexing, during said even byte read cycle, said first data byte onto an odd portion of said local microprocessor bus and a second data byte from a second M-bit memory location of said memory unit onto an even portion of said local microprocessor bus.

9. The method of claim 6 further including the steps of:

dividing at least one of said microprocessor access cycles corresponding to a microprocessor write cycle into even and odd byte write cycles, multiplexing, during said odd byte write cycle, data present upon an odd portion of said microprocessor bus onto said system bus, and multiplexing, during said even byte write cycle, data present upon an even portion of said local microprocessor bus onto said system bus.

10. In a system including a microprocessor and a memory unit, in which said microprocessor includes an N-bit local microprocessor bus and said memory unit is coupled to an N/2-bit system bus, a local microprocessor bus interface unit comprising:

a bus control unit including:

an address latch for latching selected parts of N-bit memory addresses impressed upon said N-bit local microprocessor bus by said microprocessor, said selected parts of said N-bit memory addresses comprising N/2-bit memory addresses identifying N/2-bit memory locations within said memory unit;

wherein said memory unit is configured such that consecutive ones of said N/2 bit memory addresses correspond to one of said N-bit memory addresses;

a bus interface for transferring data associated with said N/2-bit memory locations between said N/2-bit system bus and said N-bit local microprocessor bus during microprocessor memory access cycles of said microprocessor corresponding to microprocessor read cycles, wherein said selected parts of said N-bit memory addresses latched during N-bit ones of said microprocessor read cycles correspond to a sequential pair of said N/2-bit memory locations;

a programmable wait state generator for controlling duration of said microprocessor memory access cycles.

11. The bus interface unit of claim 10 wherein said bus control unit further includes:

a read cycle counter for dividing at least one of said microprocessor access cycles corresponding to said microprocessor read cycles into even and odd byte read cycles, a read latch for latching a first data byte from a first N/2-bit memory location of said memory unit during said odd byte read cycle, and multiplexer means for multiplexing, during said even byte read cycle, said first data byte onto an odd portion of said N/2-bit local microprocessor bus and a second data byte from a second M-bit memory location of said memory unit onto an even portion of said N-bit local microprocessor bus.

12. The bus interface unit of claim 10 wherein said bus control unit further includes:

a write cycle counter for dividing at least one of said microprocessor access cycles corresponding to a microprocessor write cycle into even and odd byte write cycles, and multiplexer means for:

multiplexing, during said odd byte write cycle, data present upon an odd portion of said N-bit microprocessor bus onto said N/2-bit system bus, and for multiplexing, during said even byte write cycle, data present upon an even portion of said N-bit local microprocessor bus onto said N/2-bit system bus.

* * * * *